(12) United States Patent
Davies et al.

(10) Patent No.: US 6,664,891 B2
(45) Date of Patent: Dec. 16, 2003

(54) DATA DELIVERY THROUGH PORTABLE DEVICES

(75) Inventors: Robert J. Davies, Horley (GB); Paul J. Rankin, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 35 days.

(21) Appl. No.: 09/878,684

(22) Filed: Jun. 11, 2001

(65) Prior Publication Data

US 2001/0055950 A1 Dec. 27, 2001

(30) Foreign Application Priority Data

Jun. 26, 2000 (GB) .............................................. 0015454
Aug. 15, 2000 (GB) .............................................. 0020098

(51) Int. Cl.[7] .............................................. G08B 26/00
(52) U.S. Cl. ...................... 340/505; 340/10.1; 340/539; 455/412
(58) Field of Search ................................ 340/505, 539, 340/10.1–10.6, 7.2, 7.22, 825.36, 825.49; 455/412, 418, 413, 414

(56) References Cited

U.S. PATENT DOCUMENTS 5,835,861 A    11/1998   Whiteside .................. 455/466
6,020,810 A     2/2000   Har-Even .................... 340/328
6,225,901 B1 *  5/2001   Kail, IV ..................... 340/539

OTHER PUBLICATIONS (http://www.design.philips.con/vof/) by Philips Design, 1996 "Vision of the Future: Hot Badges", p. 1.

* cited by examiner

*Primary Examiner*—Daryl Pope
(74) *Attorney, Agent, or Firm*—Jack D. Slobod

(57) ABSTRACT

A communications system comprises at least one first portable communications device (12) capable of wireless message transmission and at least one second portable communications device (10) capable of receiving such a message transmission. The first device (12) is arranged to broadcast a series of inquiry messages (60) each in the form of a plurality of predetermined data fields (INQ) arranged according to a first communications protocol, such as Bluetooth. For the delivery of additional data via broadcast, the first device (12) adds to each inquiry message prior to transmission an additional data field (BCD) carrying broadcast data, with the second portable device (10) receiving the transmitted inquiry messages and reading the broadcast data from the additional data field.

33 Claims, 4 Drawing Sheets

DATA DELIVERY THROUGH PORTABLE DEVICES

The present invention relates to services offered to users of electronic equipment, especially but not exclusively to users of mobile communications devices such as portable telephones and suitably equipped PDA's (personal digital assistants). The invention further relates to means for use in the delivery of such services, and to devices for receiving them.

Recent years have seen a great increase in subscribers world-wide to mobile telephone networks and, through advances in technology and the addition of functionalities, cellular telephones have become personal, trusted devices. A result of this is that a mobile information society is developing, with personalised and localised services becoming increasingly more important. Such "Context-Aware" (CA) mobile telephones are used with low power, short range base stations in places like shopping malls to provide location-specific information. This information might include local maps, information on nearby shops and restaurants and so on. The user's CA terminal may be equipped to filter the information received according to pre-stored user preferences and the user is only alerted if an item of data of particular interest has been received.

An example of a CA terminal is given in U.S. Pat. No. 5,835,861 which discloses the use of wireless telephones within the context of advertisement billboards. The user of a wireless telephone obtains the telephone number of a vendor by activating his/her wireless telephone to transmit a prompt signal to an active advertisement source and to receive from the advertisement source a response signal containing the telephone number of the advertising vendor. The telephone number can then be used to automatically place a call to that vendor via the public switched telephone network. Alternatively, the telephone number can be stored for use later on. This arrangement can be used to place a call to a vendor without having to either memorise the telephone number or to write it down. The signals between the billboard and the caller can be transmitted as modulated infrared (IR) signals.

Many services and applications proposed for CA systems benefit from a genuine broadcast mode that does not require the mobile terminal to join a wireless network. The Media Lab of MIT have devised 'meme badges' or 'Thinking Tags' which allow wearers to exchange simple text messages or quotations when they are within i.r. range and in line-of-sight. Other similar concepts such as 'hot badges' have been published, for example by Philips Design in their 1996 'Vision of the Future' (http://www.design.philips.com/vof/), where personal devices broadcast profile information about their users to the local area, to be picked up by other nearby participants for correlating personal matches. In addition, a short-range r.f. device ("the Lovegety") became a craze for 'blind date' facilitation between teenagers in Japan in 1998. Users of the Lovegety could set one of three pre-assigned signals and be audibly and visually alerted when another Lovegety owner was in range, the alert being different when the encountering users have both selected the same settings (which might correspond for instance to looking for a date).

The authors of these devices and concepts have articulated a range of personal and social applications that can be facilitated by such electronic augmentations of users' projections of personalities, interests, moods, skills or resources. The Lovegety craze indicates the potential mass popularity of such a short-range r.f. device for teenagers. In a professional setting, such as a large commercial show, such 'ice-breaker' devices can bring together people with complementary business interests or be used as a form of electronic business card exchange.

Custom devices such as those above are limited in their market penetration, while mobile telephones are rapidly becoming ubiquitous. With Bluetooth communications protocols predicted to become a common technology in mobile communications devices, one possible solution to the problems of establishing a broadcast mode for CA applications might be via the full current Bluetooth handshaking process to set up a two-way Bluetooth connection for data exchange between mobiles carried by consenting users selecting such a service. As explained in our co-pending United Kingdom patent application no. 0015454.2 (from which the present application claims priority, and the disclosure of which is incorporated herein by reference), in the context of mobile user encounters with fixed beacons, the current Bluetooth connection protocol carries the disadvantages of:

Time to establish the connection before any data can be exchanged (10–30 seconds, by which time the encountering parties may be out of r.f. range);

Power consumption for hand shaking transmissions on behalf of the listening device to establish network connection;

Limits of number of active listening devices that can be addressed by the broadcasting device (7 active in a piconet);

Loss of privacy by the listening device as its device id. becomes known by the broadcasting device in the process of establishing the connection. In many opportunistic situations, the listener to a broadcast wishes their identity and location to remain anonymous and private. This is a major drawback.

Another possible solution for these CA applications might be via a central service that registers those mobile users in proximity to a fixed infrastructure and for example compares web-stored user profiles, alerting users via Bluetooth or the cellular network of matches. However this again suffers from some of the disadvantages above (especially privacy) and, in addition, restricts the encounters to pre-determined places where a user-locating r.f. beacon is installed, rather than ad-hoc encounters.

It is therefore an object of the invention to provide a means whereby users of portable communications devices can broadcast information to one another without requiring dedicated hardware or a fixed infrastructure.

In accordance with a first aspect of the present invention there is provided a communications system comprising at least one first portable device capable of wireless message transmission and at least one second portable device capable of receiving such a message transmission, wherein the at least one first portable device is arranged to broadcast a series of inquiry messages each in the form of a plurality of predetermined data fields arranged according to a first communications protocol, wherein the at least one first portable device is further arranged to add to each inquiry message prior to transmission an additional data field, and wherein the at least one second portable device is arranged to receive the transmitted inquiry messages and read data from said additional data field. By the addition of a broadcast messaging scheme to the inquiry phase, messages may be transmitted from one user to another (or to many) without requiring either the sending or receiving user device to join a piconet.

In such a system, the at least one first portable device may be arranged to add said additional data field at the end of a respective inquiry message and/or the at least one first portable device may be arranged to include an indication in one of said predetermined data fields, said indication denoting the presence of said additional data field.

Suitably, although not essentially, the above-referenced first communications protocol comprises Bluetooth messaging, with the at least one first portable device optionally being configured to broadcast a series of inquiry messages on a predetermined clocked succession of frequencies, with clock information for said first portable device being included in data carried by said additional data field. As will be described hereinafter, the said additional data field may be of any given size, from a few bits to at least 64 bits of data and optionally more.

To enable a portable device to filter out unwanted messages in a system as above, the at least one first portable device may be arranged to include in a message first comparison data, and the at least one second portable device may further comprise storage means holding second comparison data and comparator means arranged to identify when there is a match between the first and second comparison data and present the data read from the additional data field, otherwise to not present the data. The system may further comprise means for generating such second comparison data from user profiling of the user of said second portable device.

In accordance with another aspect of the present invention, there is provided a mobile communication device for use as the said first portable device in a system as recited hereinabove, the device comprising communications components capable of wireless message transmission and arranged to broadcast a series of inquiry messages each in the form of a plurality of predetermined data fields arranged according to a first communications protocol, and to add to each inquiry message prior to transmission said additional data field.

Still further in accordance with the present invention, there is provided a mobile communication device for use as the said second portable device in a system as recited hereinabove, the device comprising a receiver capable of receiving a short-range wireless inquiry message including a plurality of data fields according to a first communications protocol, means for determining when an additional data field has been added to said plurality of data fields, and means for reading data from such an additional data field and presenting the same to a user.

Preferably, although not essentially, a portable communications device embodying the present invention is configured to receive and/or send messages according to Bluetooth protocols, having the technical features of both the above-recited first and second portable devices. Such a portable communications device may further comprise user-operable means for selecting operation as said first or said second portable device and/or control means operable to switch between operation as said first or said second portable device may be provided. In order to avoid synchronisation problems, as described hereinafter, such control means are suitably operable to switch between operation as said first or said second portable device at pseudo-random intervals.

Yet further in accordance with the present invention there is provided a method for enabling the user of a first portable communications device to broadcast messages to the users of other portable communications devices, wherein said first portable communications device broadcasts a series of inquiry messages each in the form of a plurality of predetermined data fields arranged according to a first communications protocol, and wherein said first portable communications device adds to each inquiry message prior to transmission an additional data field carrying broadcast message data, such that suitably configured other portable devices may receive the transmitted inquiry messages and read the broadcast data from said additional data field.

In such a method, the first portable communications device may suitably add said additional data field at the end of a respective inquiry message and/or the first portable communications device may include an indication in one of said predetermined data fields, said indication denoting the presence of said additional data field.

According to an alternate embodiment of the present invention, there is provided a communications system comprising at least one portable device capable of wireless message transmission and at least one fixed receiver device capable of receiving such a message transmission, wherein the at least one portable device is arranged to broadcast a series of inquiry messages each in the form of a plurality of predetermined data fields arranged according to a first communications protocol, wherein the at least one portable device is further arranged to add to each inquiry message prior to transmission an additional data field, and wherein the at least one fixed receiver device is arranged to receive the transmitted inquiry messages and read data from said additional data field. Thus it will be seen and understood that it is not mandatory for conformance with the present invention that the message recipient be a portable device.

Preferred embodiments of the invention will now be described, by way of example only, and with reference to the accompanying drawings, in which.

Figure 1:
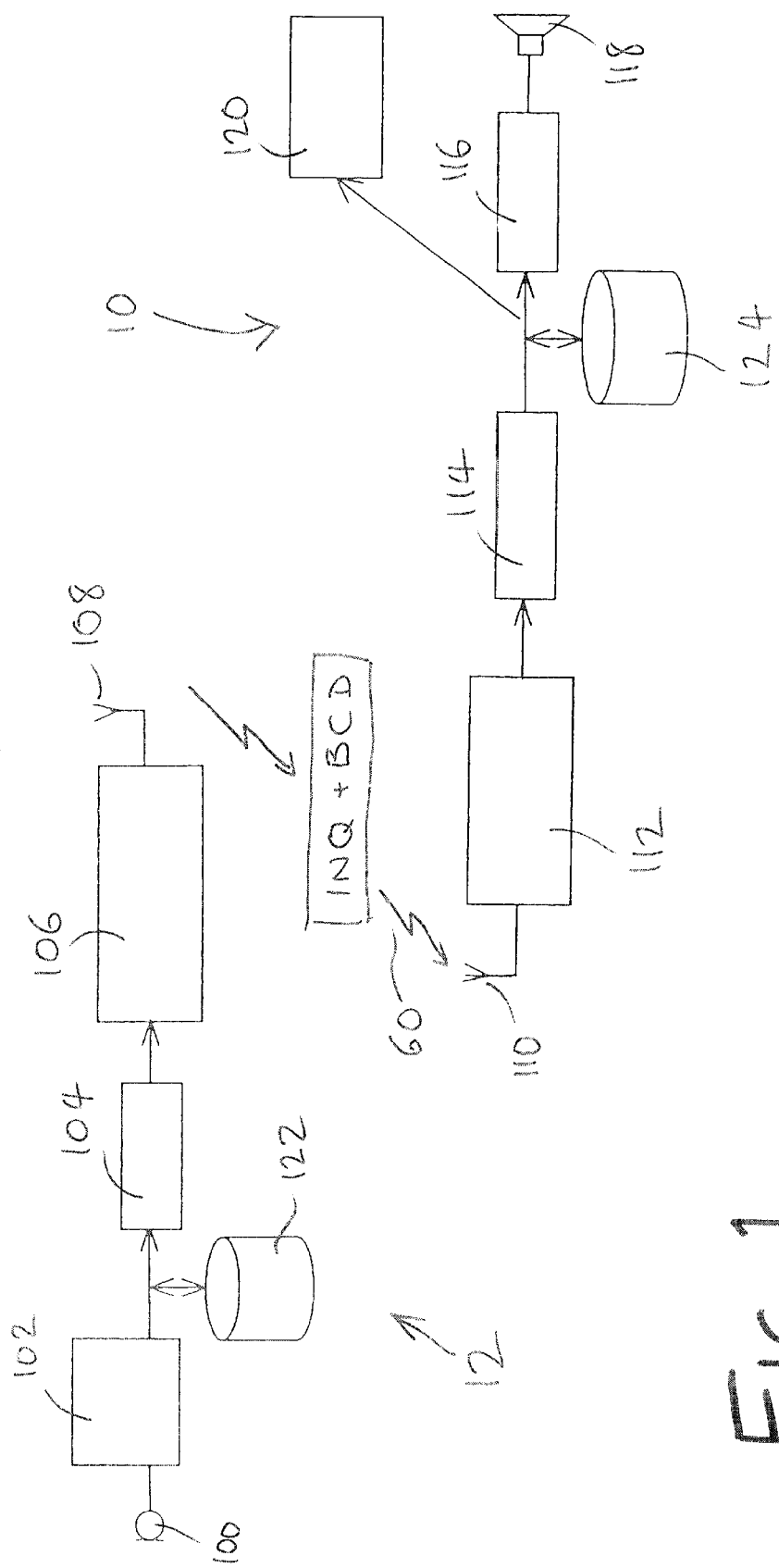
FIG. 1 is a simplified schematic of a pair of portable devices illustrating data flow.

In the following description we consider particularly a CA application which utilises Bluetooth protocols for communication of messages from beacon to portable device (whether telephone, PDA or other), and particularly from portable device to beacon, and from one portable device to another. As will be recognised, the general invention concept of including a broadcast channel as part of the inquiry procedure is not restricted to Bluetooth devices, and is applicable to other communications arrangements, in particular frequency hopping systems.

The solution is to use the basic 'data broadcast over inquiry phase' proposal, where the mobile devices are now the broadcasters. This method solves the limitations of full Bluetooth handshaking to establish a Bluetooth connection, as described above, allowing any number of listening devices in a crowded locale to receive the broadcast data from broadcasting user, while preserving listeners' anonymity.

We can anticipate a gross transmission rate for broadcast over inquiry of around 64 Kbytes per cycle. If the master performs the Inquiry cycle continuously (i.e. only broadcasts and never sets up a piconet) then we have a gross bit rate of 50 kbit/s. This data rate easily allows a user to broadcast around themselves say an XML-typed profile description in a standardised format such as the W3C proposals for profile data formats (OPS), or a broadcast message, perhaps tagged by a classification type to aid filtering by different listening devices. Alternatively, musical aura or a stream of speech about the user or their interests in finding a business or leisure partner might be broadcast locally by the user.

The listening devices need to recognise that there is broadcast data in the incoming inquiry packets, extract their type (broadcast by a mobile user), and the information to decode the media format being broadcast. Incoming data which is tagged by classes, such as 'sports interests', 'gender' etc needs to be matched again the listener's profile looking for matches.

One important step is required since mobiles equipped with Bluetooth will only have one radio, then they can either be broadcasting inquiry data or listening, but not performing both simultaneously. Moreover, if two mobiles happen to be synchronised in receiving/transmitting (e.g. by an external trigger they both received), then it is possible for them to never hear each other's broadcasts. The solution is to arrange that mobiles can be put into mode of alternately broadcasting and listening, and that the start time for this cycle is pseudo-randomly chosen on each mobile. Users might chose between three possible states for their mobile:

Only broadcasting, deaf to other's broadcasts
Only listening, dumb so not broadcasting at all
Cycling between broadcasting and listening states.

In a typical embodiment, the "hot-badge" type of social applications extend the applicants technique of embedding broadcast data in the inquiry phase signals from fixed Bluetooth devices to include one-way, connectionless data broadcasts from mobile devices carried by users. In addition, a portal matching process is preferred to be included on mobiles that can filter such mobile broadcasts or offers from other users. This filtering is easy to do when they have been tagged according to some common classification scheme (e.g. in XML).

A Bluetooth-equipped GSM or UMTS or other cellular phone is expected to be a common implementation platform for the terminal in this application. However, there are clearly other platforms, e.g. the usual PDAs and even laptop personal computers that are normally listed as possible mobile Bluetooth platforms.

Users can select a set of, optionally predefined, data for local broadcast from their mobile, possibly including their web site or phone number for interested other parties to connect to follow up. This data may be in the form of coded emotive graphic icons, compressed text messages, lists of personal interests or desired characteristics etc. Some data for instance might be decoded and displayed by a listening device as a series of SMS messages, e.g. 'Does anyone like rock music?' or 'Call me, I'm a supplier of cheap computers', 'I'm a doctor', 'I'm a Madonna fan' etc.

The listening devices, such as the Bluetooth-enabled mobiles of other users, need to be able to detect Bluetooth inquiry polling signals which have been tagged as containing one-way broadcast data. These listening devices should then have the ability to remain silent, without transmitting Bluetooth responses to the incoming inquiry signals. Incoming inquiry signals tagged as containing data packets then require decoding by the listening device to extract, decode and interpret the embedded broadcast data. Additional characteristics, or metadata (e.g. as XML descriptions) which accompany the contents of the broadcast data can be then optionally be compared against the listener's own interest or search profile and filtered. Broadcasts surviving this filtering process can then be alerted on the listener's mobile as a visual, audible or tactile signal (e.g. a vibration).

Thus any number of other users within range of the r.f. broadcasts can decode the broadcast stream, while still remaining anonymous. These users can therefore be alerted of interesting social opportunities, and optionally follow up any connection pointers to web URL's or telephone numbers accompanying the broadcast, or may in return broadcast a version of their own data (possibly modified in response to the received data).

A simplified data flow for this application is shown in FIG. 1, starting from microphone 100 of transmitting portable device 12, via activation stage 102 and codec 104 to broadcasting terminal 106. From aerial 108, message 60 travels via aerial 110 to listening terminal 112 in receiving portable 10. From the listening terminal 112, an audio message will travel via codec 114 and digital to analog converter 116 to loudspeaker 118. Data messages for display will be routed from the output of codec 114 to display device 120. At each side, a data store 122, 124 may be used to provide local storage of messages/data etc.

There are many possible variations on this scheme including the use of preset messages, messages synthesised from sampled words or allophones, speech synthesis. It might also be convenient to store messages in coded form to save memory. Other arrangements are possible.

Figure 2:
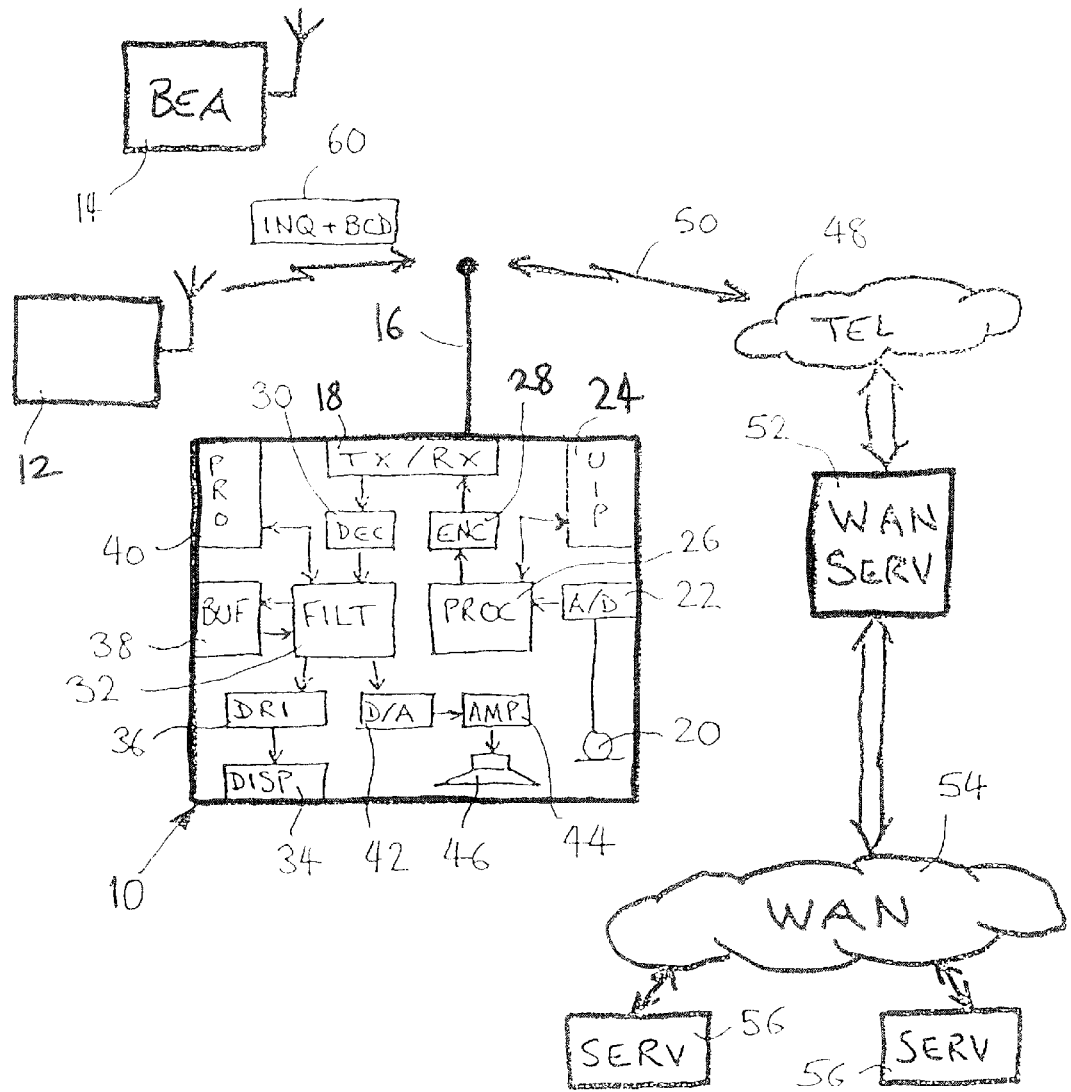
FIG. 2 is a block schematic diagram of a beacon and a pair of portable devices embodying the invention.

At the broadcasting terminal, the broadcast data has to be packetized before it is sent over the air. A personal broadcast data packet might contain the following, non-exhaustive list of fields:

Header:
  Protocol discriminator ("personal broadcast audio")
  Packet length indicator
    Modality (iconic, textual, musical, speech) of packet content data
    Metadata describing content, or referencing to an agreed classification schema
  Codec type
    Start/end/middle/whole packet
  Packet number
Main body:
  Coded content data FIG. 2 is a block schematic diagram of a CA mobile telephone 10 in use with another such device 12 and one or more low power, short range base stations or beacons 14. As mentioned previously, and discussed in greater detail below, such an arrangement may be used in places like shopping malls to provide location-specific information such as local maps, information on nearby shops and restaurants and so on, with the beacon downloading information keys to a mobile device: this is in addition to the interaction between mobile users 10, 12. An information key is a small data object that provides a reference to a source of full information, and it is in the form of a number of predetermined fields, one of which will contain a short piece of descriptive text presented to a user. Another field will be a pointer or address of some form, for example a URL or telephone number. Other supplementary fields may control how the data is presented to a user and how the address may be exploited. The beacon 14 and/or mobile device 12 will generally broadcast cyclically a number of these keys, each typically relating to a different service or items of data.

The user's CA terminal 10 comprises an aerial 16 coupled with transceiver stage 18 for the reception and transmission of messages. Outgoing messages result from user input to the telephone, either audio input via microphone 20 and A/D converter 22 or other data input via the keypad or other input means 24. These inputs are processed to message data format by signal and data processing stage 26 and converted to transmission format by encoder 28 before being supplied to the transceiver stage 18.

Messages received via the aerial 16 and transceiver 18 are passed via a decoding stage 30 to a filtering and signal processing stage 32. If the data carried by the message is for presentation on a display screen 34 of the telephone, the data will be passed to a display driver 36, optionally after buffering 38, with the driver formatting the display image. As will be recognised, the display 34 may be a relatively simple low-resolution device, and the conversion of received data to display data may be carried out as a subset of the processing stage 32 functionality, without the requirement for a dedicated display driver stage.

Where the message is carrying data from another user 12 or one of the beacons 14, the telephone has the ability to filter the information received according to pre-stored user preferences and the user is only alerted (i.e. the information will only be retained in buffer 38 and/or presented on screen 34) if comparison of stored preference data and subject matter indicators in the message indicate that an item of data of particular interest has been received.

For conventional audio messages, the audio data is output by the filter and processing stage 32, via D/A converter 42 and amplifier 44 to an earphone or speaker 46. Receipt of such messages from the telephone network 48 is indicated by arrow 50: the telephone network 48 also provides the link from the telephone 10 to a wide-area network (WAN) server 52 and, via the WAN 54 (which may be the internet), to one or more remote service providers 56 providing a source of data for the telephone 10.

Communication between the receiving CA terminal (telephone 10) and a transmitter user station 12 (or beacon 14) takes two forms: 'push' and 'pull'. In 'push' mode, information is broadcast by the devices 12, 14, to all portable terminals 10 in the form of short 'keys' indicated at 60. The keys will take various forms according to the application but will generally include a concise description of the information being sent and a pointer to fuller information, e.g. a URL identifying one of the service providers 56.

Keys are received by the terminal 10 'unconsciously', that is, without direct intervention by the user, and automatically filtered according to the user's pre-set preferences. Some will be discarded, some kept for further study, others might cause the user to be alerted immediately. By way of example, shops might choose to push details of special offers into passing terminals in the knowledge that users who have interest and have therefore set their filters 32 accordingly will be alerted by their terminal.

Sometimes the user will wish to obtain more information than is contained in the keys. Here, 'pull' mode allows a user to set up a connection with a server 56 (which need not necessarily be specially configured for CA use) and actively request information to pull down into the terminal 10. This mode is therefore typically interactive.

Figure 3:
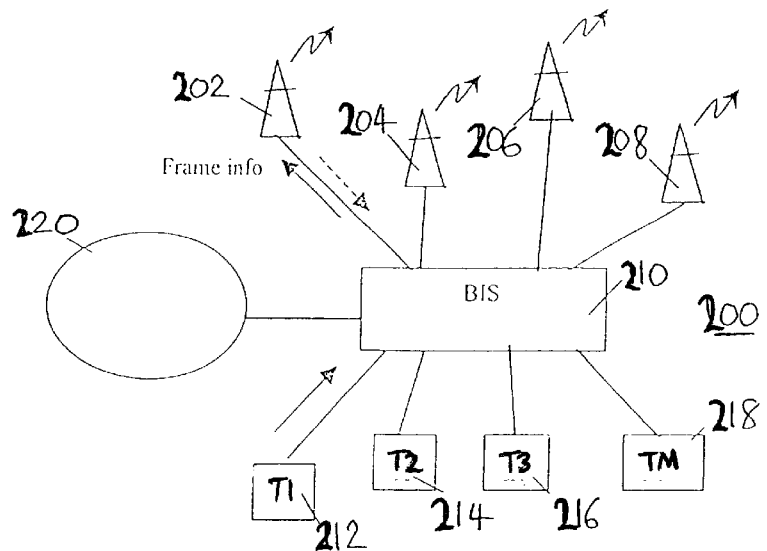
FIG. 3 is a schematic diagram of a series of devices in a linked beacon infrastructure.

Whilst base stations or beacons will typically be independent of one another (in a shopping mall set up, each shop provides and maintains its own beacon without reference to any beacons provided by neighbouring shops), the beacons may be wholly or partially networked with at least some coordination as to their broadcast messages. FIG. 3 is a diagram of such a system 200 of linked beacons embodying the invention and providing an implementation of an infrastructure for use in, for example, department stores, shopping malls, theme parks, etc. The system 200 comprises a plurality of beacons 202, 204, 206, 208 distributed over a series of locales. Each of the beacons 202–208 broadcasts one or more short-range inquiry signals in a time-slot format as described in greater detail hereinafter. The beacons 202–208 are controlled by a beacon infrastructure server (BIS) 210, with one or more terminals 212, 214, 216, 218 being connected to the server 210. The terminals 212–218 enable service providers, i.e., the users of beacons 202–208, to author or edit allocated service slots in the form of added data piggy backed on inquiry facilitation signals transmitted by beacons 202–208. A service provider may lease a beacon or one of the beacon's service slots from the infrastructure provider. To this end, server 210 provides simple HTML templates for filling out by the user via one of terminals 212–218. Having filled out the template with, for example, a description of the service and other information for the data to be carried via the beacon broadcast, the template is returned to server 210, preferably via a secure link using, e.g., Secure HTTP (S-HTTP) or Secure Sockets Layer (SSL). SSL creates a secure link between a client and a server, over which any amount of data can be sent securely. S-HTTP is designed to transmit individual messages securely. Server 210 then creates the appropriate additional data package for appending to the inquiry signal of a relevant one of the beacons 202–208 based on the information submitted with the template. The system 200 may further comprise an application server 220 to assist in carrying out various functions, as will be readily understood by the skilled reader.

Referring back to FIGS. 1 and 2, a strong candidate technology for the wireless link necessary for at least the 'push' mode of the above-described CA system is Bluetooth. In analysing the Bluetooth protocol for CA broadcast or 'push' mode utilisation, a problem may be seen. In the ideal case, the terminal 10 will detect transmitting mobiles 12 or fixed beacons 14 and extract basic information from them without the terminal 10 needing to transmit at all. However, this type of broadcast operation is not supported by the current Bluetooth specification.

In part, the incompatibility follows the frequency hopping nature of Bluetooth beacon systems which means that, in order for broadcast messages (or, indeed, any messages) to be received by a passing terminal, the terminal has to be synchronised to the beacon in both time and frequency. The portable device 10 has to synchronise its clock to the beacon (or transmitting mobile device) clock and, from the beacons identity, deduce which of several hopping sequences is being employed.

To make this deduction, the portable device has conventionally been required to join—as a slave—the piconet administered by the beacon as piconet master. Two sets of procedures are used, namely "inquiry" and "page". Inquiry allows a would-be slave to find a base station and issue a request to join the piconet. Page allows a base station to invite slaves of its choice to join the net. Analysis of these procedures indicates that the time taken to join a piconet and then be in a position to receive information from the master could be several tens of seconds, which is much too long for CA applications, where a user may move out of range of a beacon before joining could be completed.

The Bluetooth inquiry procedure has been proposed specifically to solve the problem of bringing together master and slave: the applicants have recognised that it is possible to piggy-back a broadcast channel on the inquiry messages issued by the master. Only CA terminals need read the broadcast channel messages and only CA base stations or beacons send them. In consequence, at the air interface, the mechanism is entirely compatible with conventional (non-CA) Bluetooth systems.

Figure 4:
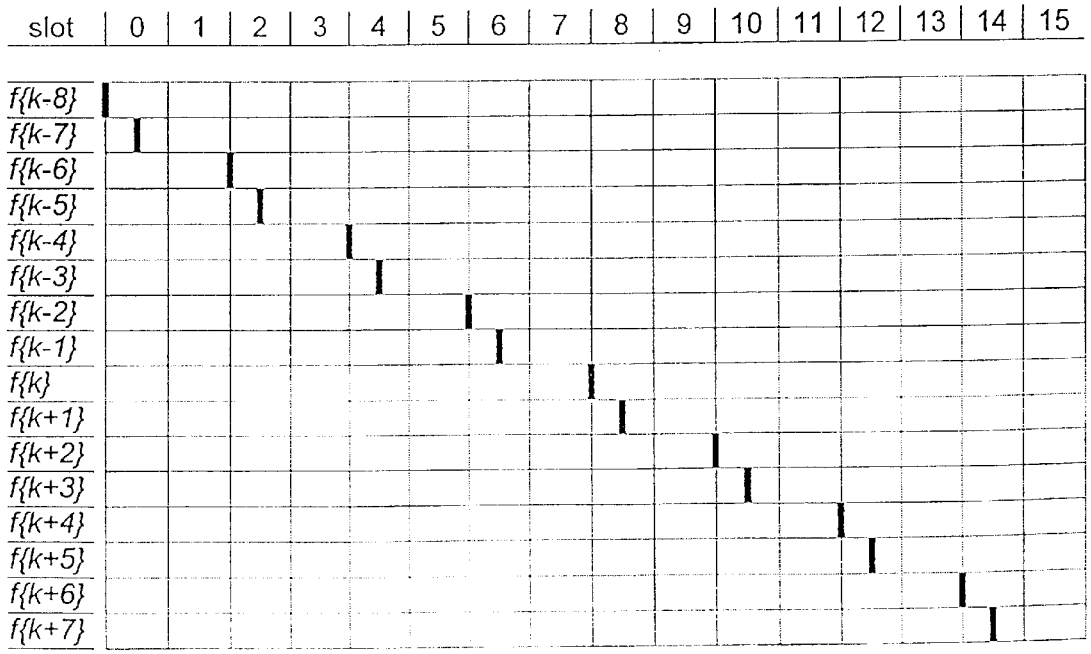
FIG. 4 is a chart illustrating the transmission of a train of inquiry access codes centred on a given frequency.
Figure 5:
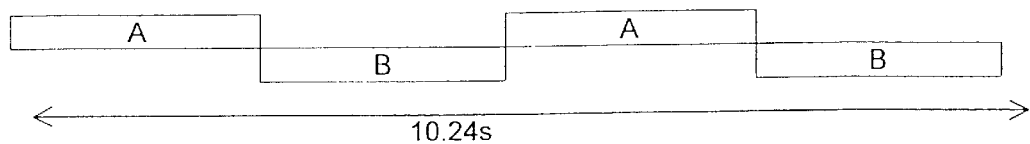
FIG. 5 illustrates alternation between trains of inquiry messages over the duration of an inquiry broadcast.

To illustrate how this is implemented, we first consider how the Inquiry procedures themselves operate, with reference to FIGS. 4 and 5. When a Bluetooth unit wants to discover other Bluetooth devices, it enters a so-called inquiry substate. In this mode, it issues an inquiry message containing a General Inquiry Access Code (GIAC) or a number of optional Dedicated Inquiry Access Codes (DIAC). This message transmission is repeated at several levels; first, it is transmitted on 16 frequencies from a total of 32 making up the inquiry hopping sequence. The message is sent twice on two frequencies in even timeslots with the following, odd timeslots used to listen for replies on the two corresponding inquiry response hopping frequencies. Sixteen frequencies and their response counterparts can therefore be covered in 16 timeslots, or 10 ms. The chart of FIG. 4 illustrates the transmission of a sequence on sixteen frequencies centred around f{k}, where f{k} represents the inquiry hopping sequence.

The next step is the repetition of the transmission sequence at least $N_{inquiry}$ times. At the very least, this should be set at $N_{inquiry}$=256 repetitions of the entire sequence which constitutes a train of transmission which we refer to as inquiry transmission train A. Next, inquiry transmission train A is swapped for inquiry transmission train B consisting of a transmission sequence on the remaining 16 frequencies. Again, the train B is made up of 256 repetitions of the transmission sequence. Overall, the inquiry transmissions cycle between transmissions of train A and train B. As shown by FIG. 5, the specification states that this switch between trains must occur at least three times to ensure the collection of all responses in an error-free environment. This means that an inquiry broadcast could take at least 10.24 seconds.

One way to reduce this would be for the switch between inquiry transmission trains to be made more rapidly, i.e. without waiting until the 2.56 seconds for 256 repetitions of the 10 ms to cover the 16 timeslots is up. This may suitably be accomplished by setting the systems to switch over if no inquiry message is detected after say 50 ms, on the understanding that no such message will be detected in the remainder of the present train.

A portable device that wants to be discovered by a beacon enters the inquiry scan substate. Here, it listens for a message containing the GIAC or DIAC's of interest. It, too, operates in a cyclic way. It listens on a single hop frequency for an inquiry scan period which must be long enough to cover the 16 inquiry frequencies used by the inquiry. The interval between the beginning of successive scans must be no greater than 1.28 seconds. The frequency chosen comes from the list of 32 making up the inquiry hopping sequence.

On hearing an inquiry containing an appropriate IAC, the portable device enters a so-called inquiry response substate and issues a number of inquiry response messages to the beacon. The beacon will then page the portable device, inviting it to join the piconet.

Figure 6:
FIG. 6 illustrates the insertion of a packet of broadcast data within an existing transmission slot.

As mentioned above and shown in FIG. 6, the applicants propose that the inquiry messages issued by the base station have an extra field appended to them, capable of carrying a user-defined payload (CA DATA). In the CA scenario, this payload is used to carry broadcast information, or keys, to CA terminals during the inquiry procedure. By adding the field to the end of the inquiry message, it will be appreciated that non-CA receivers can ignore it without modification. In addition, by using a CA-specific DIAC, CA receivers can be alerted to the presence of the extra information field.

The presence of the extra data field means that the guard space conventionally allowed at the end of a Bluetooth inquiry packet is reduced. However, this space—provided to give a frequency synthesiser time to change to a new hop frequency—will be generally unused otherwise, as current frequency synthesisers are capable of switching at speeds which do not need extension into the extra guard space. The standard inquiry packet is an ID packet of length 68 bits. Since it is sent in a half-slot, the guard space allocated is (625/2−68)=244.5 $\mu$s (625 $\mu$s slot period, 1 Mbit/s signalling rate). Modern synthesisers can switch in much less time with figures of 100 $\mu$s or lower considered routine by experts in the field. Applicants therefore propose allocation of 100 bits as a suitable size for this new field, although it will be readily recognised that other field sizes are, of course, possible.

CA handsets can receive the broadcast data quickly without being required to run through a lengthy procedure to join a piconet. In addition, since there is no need for the handset to transmit any information whatsoever, there is a consequent power saving that will be particularly important in dense environments where many CA base stations may be present. Nevertheless, when the handset is in interactive mode and wishes to join a piconet in order to obtain more information, it may employ the default inquiry procedures as normal. There is no loss of functionality through supporting the additional data field.

In a typical embodiment, four of our 100 bits will be lost as trailer bits for the ID field; this is a consequence of it being read by a correlator. Of the 96 bits remaining, applicants preferred allocation is that 64 be used as data and 32 as a ⅔ FEC (forward error correction) checksum, although the checksun, any headers included, and other overheads may greatly reduce the number of bits available for data, perhaps to 10 bits or fewer in some circumstances. Each inquiry burst thus contains 8 bytes of broadcast data. In a most common scenario, by the second group of A and B trains the portable device has found the base station, understood it to be a CA beacon and is awaiting the broadcast data. Since it will be listening specifically, the portable device will at least be able to read 256 bursts of data twice (A and B), giving us two lots of 2 Kbytes, or 4 Kbytes in total.

Figure 7:
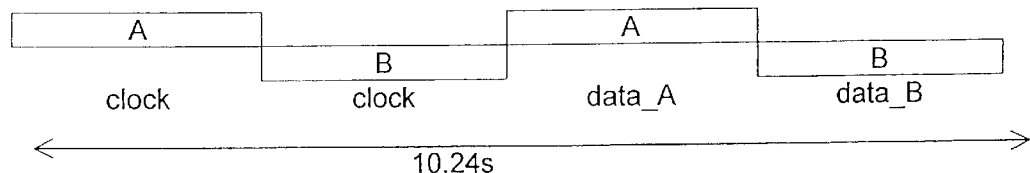
FIG. 7 illustrates a first arrangement for sending clock data in a sequence of inquiry message trains.

At this stage, the portable device does not know the phase of the beacons clock because this information is not been transmitted. To assist the portable device, clock information is transmitted in at least some of the trains in the first A and B groups, as shown in FIG. 7, together with some auxiliary information indicating when the next switches between A and B will occur. This clock information will be transmitted in place of the CA broadcast data so means are provided to discriminate between the two data channels. Use of separate DIAC's is one possible method.

In the case where the portable device knows the timing of the beacon, the portable devices also knows how it will hop, which gives the ability to track all transmissions of a train. Since there are 16 transmissions in a frame, then the resultant CA channel has 16 times as much capacity and can convey 64 Kbytes of information.

Figure 8:
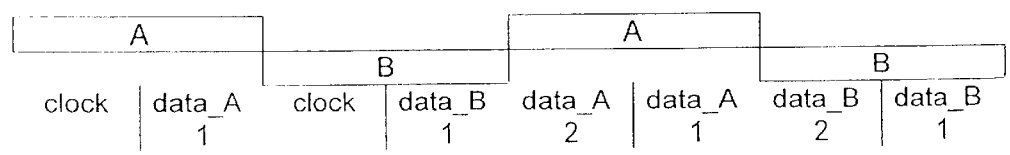
FIG. 8 illustrates an alternate arrangement to that of FIG. 7 for the sending of clock data.

Since the terminal wakes up every 1.28 seconds or less, it will generally have obtained the clocking information it needs by the half way mark in the first A or B periods. Switching from clock to data at these halfway marks, as illustrated in FIG. 8, provides a number of useful advantages. Firstly, some data can be received in less than five seconds from the start of the inquiry procedure. Secondly, the terminal can still respond to an important key by automatically issuing an inquiry response message to the base station (if that is the appropriate action for the terminal to take) even if the key appears comparatively late in the cycle. It will be noted that no increase in capacity is assumed.

In the foregoing, a portable device will receive all the additional data field packets on one of the 32 inquiry channels, thereby using only ⅟₃₂ of the available bandwidth. As will be recognised, if the uncertainty as to when a portable terminal (beacon slave) receives the first inquiry packet can be overcome, the predetermined nature of the hopping sequence may be accommodated and the full bandwidth therefore utilised. For a slave to synchronise with a masters inquiry hopping sequence from the point where it received the first packet, the slave needs to know both the masters clock offset and the position of the first received packet in the masters hopping sequence. In the following example, it is assumed that the master follows the Bluetooth minimum enquiry procedure, which comprises 256 repetitions of the 16-channel inquiry hopping sequences, with three train switches (as in FIG. 4). Each sweep across the 16 channels takes 10 ms.

An alternative method of synchronising the slave hopping is to transmit clocking data in every broadcast field. The additional data field (BCD; FIG. 1) carries 4 bytes containing the following information:

Master clock offset (2 bytes);

Number of full train repetitions (1 byte)—assuming that a full train consists of 256 repetitions of 10 ms trains, the range of this parameter is 0–255 (before the inquiry switches to the next full train). This indicates to the slave when the master will next switch the full train.

How many full train switches have been completed in the current inquiry cycle (1 byte)—this data indicates to the slave what the master is likely to do at the end of the current full train, i.e. whether it will switch over to another full train or whether the inquiry procedure will terminate.

As long as no channel repeats in the 10 ms train, no field is required to indicate the position of the current channel in the hopping sequence as the slave is able to derive this from knowledge of the sequence.

From the foregoing it will be seen that, by adding 4 bytes to each additional field packet, the slave can then pick up all additional field packets to the end of the inquiry, whilst still having 4 bytes available (from our preferred assignment of 64 from 100 bits for data) to carry broadcast data.

Considering a complete beacon signal, it will be readily understood that it will need to be divided into a number of 4-byte packets with one being sent with each inquiry packet. Assuming a fixed length of beacon signal for the purposes of illustration, at 16 kB the full signal can be accommodated on a single inquiry train (a train being 256 repetitions of the 16-channel hop sequence, giving 256*16*4 bytes=16 kB).

Extending this, by fixing that the first packet of a beacon signal goes on the first packet of an inquiry train, from the message indicator field for the number of repetitions for the current 16-channel hopping sequence in the message header, the slave is enabled to derive the position of the beacon packet it has received in the complete beacon signal.

From reading the present disclosure, other modifications will be apparent to persons skilled in the art. Such modifications may involve other features which are already known in the design, manufacture and use of fixed and portable communications systems, and systems and components for incorporation therein and which may be used instead of or in addition to features already described herein. For example, any broadcast data within a pre-determined locale may be picked up by a local fixed Bluetooth unit for relaying on to other fixed broadcasting units covering a larger area than the range of the personal broadcast from one mobile: this retains some privacy over a system where the users all register with a central service. Other extensions might include use of a fixed beacon to trigger broadcasts of a certain subset of user data from consenting or registered mobile users within a specific locale. For example, a beacon in a disco might be set up to trigger personal broadcasts from the mobiles of all users within its range, the broadcasts projecting to others the 'music tastes' section of their personal profiles. Finally, listening mobiles may record the personal broadcasts encountered by the user, along with any connection pointers for later use.

What is claimed is:

1. A communications system comprising at least one first portable device capable of wireless message transmission and at least one second portable device capable of receiving such a message transmission, wherein the at least one first portable device is arranged to broadcast a series of inquiry messages each in the form of a plurality of predetermined data fields arranged according to a first communications protocol, wherein the at least one first portable device is further arranged to add to each inquiry message prior to transmission an additional data field, and wherein the at least one second portable device is arranged to receive the transmitted inquiry messages and read data from said additional data field.

2. A system as claimed in claim 1, wherein the at least one first portable device is arranged to add said additional data field at the end of a respective inquiry message.

3. A system as claimed in claim 1, wherein the at least one first portable device is arranged to include an indication in one of said predetermined data fields, said indication denoting the presence of said additional data field.

4. A system as claimed in claim 1, wherein said first communications protocol comprises Bluetooth messaging.

5. A system as claimed in claim 4, wherein the at least one first portable device is configured to broadcast a series of inquiry messages on a predetermined clocked succession of frequencies, with clock information for said first portable device being included in data carried by said additional data field.

6. A system as claimed in claim 1, wherein the at least one first portable device is arranged to include in a message first comparison data, the at least one second portable device further comprising storage means holding second comparison data and comparator means arranged to identify when there is a match between the first and second comparison data and present the data read from the additional data field, otherwise to not present the data.

7. A system as claimed in claim 6, further comprising means for generating said second comparison data from user profiling of the user of said second portable device.

8. A mobile communication device for use as said first portable device in the system of claim 1, the device comprising communications components capable of wireless message transmission and arranged to broadcast a series of inquiry messages each in the form of a plurality of predetermined data fields arranged according to a first communications protocol, and to add to each inquiry message prior to transmission said additional data field.

9. A mobile communication device for use as said second portable device in the system of claim 1, the device comprising a receiver capable of receiving a short-range wireless inquiry message including a plurality of data fields according to a first communications protocol, means for determining when an additional data field has been added to said plurality of data fields, and means for reading data from such an additional data field and presenting the same to a user.

10. A device as claimed in claim 9, further comprising the technical features recited in claim 8 enabling said device to further function as said first portable device.

11. A device as claimed in claim 10, further comprising user-operable means for selecting operation as said first or said second portable device.

12. A device as claimed in claim 10, further comprising control means operable to switch between operation as said first or said second portable device.

13. A device as claimed in claim 12 wherein said control means is operable to switch between operation as said first or said second portable device at pseudo-random intervals.

14. A method for enabling the user of a first portable communications device to broadcast messages to the users of other portable communications devices, wherein said first portable communications device broadcasts a series of inquiry messages each in the form of a plurality of predetermined data fields arranged according to a first communications protocol, and wherein said first portable communications device adds to each inquiry message prior to transmission an additional data field carrying broadcast message data, such that suitably configured other portable devices may receive the transmitted inquiry messages and read the broadcast data from said additional data field.

15. A method as claimed in claim 14, wherein the first portable communications device adds said additional data field at the end of a respective inquiry message.

16. A method as claimed in claim 14, wherein the first portable communications device includes an indication in one of said predetermined data fields, said indication denoting the presence of said additional data field.

17. A communications system comprising at least one portable device capable of wireless message transmission and at least one fixed receiver device capable of receiving such a message transmission, wherein the at least one portable device is arranged to broadcast a series of inquiry messages each in the form of a plurality of predetermined data fields arranged according to a first communications protocol, wherein the at least one portable device is further arranged to add to each inquiry message prior to transmission an additional data field, and wherein the at least one fixed receiver device is arranged to receive the transmitted inquiry messages and read data from said additional data field.

18. A portable communication device for use in a communication system, the device comprising
means for
generating a series of inquiry messages each in the form of a first communications protocol comprising a plurality of predetermined fields; and
adding an additional data field to each inquiry message, the additional data field being readable by a second portable communication device;
means for transmitting the inquiry messages including the additional field so that they are readable by the second portable communication device.

19. The device of claim 18, wherein the additional field is at the end of each respective inquiry message.

20. The device of claim 18, wherein the means for generating further includes an indication in one of the predetermined fields, the indication denoting the presence of the additional data field.

21. The device of claim 18, wherein the first communications protocol comprises Bluetooth messaging.

22. The device of claim 18, wherein the means for transmitting broadcasts the series of inquiry messages on a predetermined clocked succession of frequencies, with clock information being included in the data carried by the additional data field.

23. The device of claim 18, wherein the means for generating further includes comparison data in the inquiry messages, the comparison data being for enabling the second portable device to decide whether to read data from the additional data field or not.

24. A portable communication device for use in a communications system comprising
means for receiving messages;
means for distinguishing, in received messages, at least one of a plurality of inquiry messages, each comprising plurality of fields arranged in accordance with a first communications protocol;
at least one additional data field.

25. The device of claim 24, wherein the additional field is at the end of the respective inquiry message.

26. The device of claim 24, wherein the inquiry message further includes an indication in one of the predetermined fields, the indication denoting the presence of the additional data field.

27. The device of claim 24, wherein the first communications protocol comprises Bluetooth messaging.

28. The device of claim 24, wherein a plurality of inquiry messages is on a predetermined clocked succession of frequencies, with clock information being included in the data carried by the additional data field.

29. The device of claim 24, wherein the means for generating further includes comparison data in the inquiry messages, the comparison data being for enabling the device to decide whether to read data from the additional data field or not.

30. The device of claim 24, further comprising means for generating inquiry messages of the same type that the device is arranged to distinguish.

31. The device of claim 30, further comprising user operable means for selecting operation as a receiver or generator of said inquiry messages.

32. The device of claim 30, further comprising control means operable to switch between receiving and generating said inquiry messages.

33. The device of claim 32, wherein said switching occurs at pseudo-random intervals.

* * * * *